United States Patent
Sensui

(10) Patent No.: US 11,617,948 B2
(45) Date of Patent: Apr. 4, 2023

(54) SYSTEMS AND METHODS OF DISPLAYING DIFFERENT TYPES OF VIRTUAL ITEMS ON MULTIPLE VIRTUAL CHARACTERS

(71) Applicant: NINTENDO CO., LTD., Kyoto (JP)

(72) Inventor: Kazuyoshi Sensui, Kyoto (JP)

(73) Assignee: NINTENDO CO., LTD., Kyoto (JP)

(*) Notice: Subject to any disclaimer, the term of this patent is extended or adjusted under 35 U.S.C. 154(b) by 17 days.

(21) Appl. No.: 17/224,796

(22) Filed: Apr. 7, 2021

(65) Prior Publication Data

US 2021/0316215 A1 Oct. 14, 2021

(30) Foreign Application Priority Data

Apr. 9, 2020 (JP) ............................. JP2020-070568

(51) Int. Cl.
*A63F 13/52* (2014.01)
*G06F 3/14* (2006.01)
*G06F 3/0481* (2022.01)
*G06F 3/0488* (2022.01)

(52) U.S. Cl.
CPC ............... *A63F 13/52* (2014.09); *G06F 3/14* (2013.01); *G06F 3/0481* (2013.01); *G06F 3/0488* (2013.01)

(58) Field of Classification Search
CPC ................... A63F 13/52; A63F 13/533; A63F 2300/5553; G06F 3/14
See application file for complete search history.

(56) References Cited

U.S. PATENT DOCUMENTS

| 6,428,414 | B1* | 8/2002 | Shimomura | A63F 13/58 463/31 |
| 9,218,781 | B2* | 12/2015 | Suzuki | G09G 5/00 |
| 11,321,856 | B1* | 5/2022 | Caldwell | G06K 9/00 |
| 2004/0005928 | A1* | 1/2004 | Eguchi | A63F 13/40 463/43 |

(Continued)

OTHER PUBLICATIONS

Nintendo Co., Ltd., "Animal Crossing: Pocket Camp", [online], searched on Mar. 30, 2020, Internet, URL: https://twitter.com/pokemori_jp/status/962159191673614337 (3 pages), with English-language translation from URL: https://twitter.com/animalcrossing/status/962374369535320064 (2 pages).

(Continued)

*Primary Examiner* — Chase E Leichliter
(74) *Attorney, Agent, or Firm* — Nixon & Vanderhye P.C.

(57) ABSTRACT

A plurality of game objects whose appearance can be changed are simultaneously displayed on a display section. An image corresponding to at least one type of an item object among a plurality of types of item objects is designated as a designation object on the basis of an instruction from a user. When the designation object is designated, whether each of the plurality of game objects is a wearing-possible game object that can wear the item object corresponding to the designation object or a wearing-impossible game object that cannot wear the item object corresponding to the designation object, is determined. Then, a display is changed such that the wearing-possible game object is caused to wear the item object and the wearing-impossible game object is caused not to wear the item object.

14 Claims, 13 Drawing Sheets

(56) References Cited

U.S. PATENT DOCUMENTS

| | | | | |
|---|---|---|---|---|
| 2008/0270240 | A1* | 10/2008 | Chu | G06Q 30/0239 |
| | | | | 434/350 |
| 2010/0035692 | A1* | 2/2010 | Reville | A63F 13/79 |
| | | | | 463/43 |
| 2010/0045697 | A1* | 2/2010 | Reville | G06F 9/451 |
| | | | | 345/619 |
| 2010/0134485 | A1* | 6/2010 | Bhogal | A63F 13/52 |
| | | | | 715/706 |
| 2010/0199200 | A1* | 8/2010 | Fujioka | A63F 13/12 |
| | | | | 715/765 |
| 2011/0265041 | A1* | 10/2011 | Ganetakos | A63F 13/533 |
| | | | | 715/834 |
| 2013/0116052 | A1* | 5/2013 | Okada | A63F 13/10 |
| | | | | 463/42 |
| 2014/0006386 | A1* | 1/2014 | Oh | A63F 13/61 |
| | | | | 707/722 |
| 2014/0040066 | A1* | 2/2014 | Fujioka | G06Q 30/0621 |
| | | | | 705/26.5 |
| 2014/0160149 | A1* | 6/2014 | Blackstock | A63F 13/79 |
| | | | | 345/619 |
| 2020/0388178 | A1* | 12/2020 | Barbuto | G09B 19/00 |
| 2021/0038984 | A1* | 2/2021 | Dohta | A63F 13/52 |

OTHER PUBLICATIONS

Nintendo Co., Ltd., "Animal Crossing: Pocket Camp", [online], [searched on Mar. 30, 2020], Internet-URL:https://twitter.com/pokemori_jp/status/962159191673614337, with English Translation, 5 pages.

\* cited by examiner

| CLOTHING ITEM IDENTIFICATION NUMBER | TYPE INFORMATION | CLOTHING ITEM IMAGE DATA | ... |
|---|---|---|---|
| 001 | TOPS | .... | ... |
| 002 | BOTTOMS | .... | ... |
| 003 | HEADGEAR | .... | ... |
| 004 | SOCKS | .... | ... |
| ⋮ | ⋮ | ⋮ | |

| TYPE NAME | TARGET PART INFORMATION | PC WEARING ENABLEMENT INFORMATION | NPC WEARING ENABLEMENT INFORMATION |
|---|---|---|---|
| HEADGEAR | HEAD | POSSIBLE | POSSIBLE |
| GLASSES | FACE | POSSIBLE | POSSIBLE |
| TOPS | UPPER BODY | POSSIBLE | POSSIBLE |
| BOTTOMS | LOWER BODY | POSSIBLE | IMPOSSIBLE |
| SOCKS | ANKLE | POSSIBLE | IMPOSSIBLE |
| SHOES | FOOT | POSSIBLE | IMPOSSIBLE |
| ⋮ | ⋮ | ⋮ | ⋮ |

| PART INFORMATION | WEARING CLOTHING ITEM INFORMATION |
|---|---|
| HEAD | 002 |
| FACE | 010 |
| UPPER BODY | 021 |
| LOWER BODY | 041 |
| ANKLE | 132 |
| FOOT | 068 |

SYSTEMS AND METHODS OF DISPLAYING DIFFERENT TYPES OF VIRTUAL ITEMS ON MULTIPLE VIRTUAL CHARACTERS

CROSS REFERENCE TO RELATED APPLICATION

This application claims priority to Japanese Patent Application No. 2020-070568 filed on Apr. 9, 2020, the entire contents of which are incorporated herein by reference.

FIELD

The exemplary embodiments relate to information processing in which a game object whose appearance can be changed is displayed.

BACKGROUND AND SUMMARY

Hitherto, a game in which the appearance of a player character and a non-player character can be changed has been known.

In the above game, by performing an operation for changing the clothing of one player character or one non-player character to a desired clothing item among clothing items owned by a user, the appearance of the character can be changed. In this regard, in the conventional game, the case where a plurality of clothing items and a plurality of characters exist and wearable clothing items are different for each character is not particularly taken into consideration.

Therefore, it is an object of the exemplary embodiments to provide a non-transitory computer-readable storage medium having an information processing program stored therein, etc., which allow the clothing of a plurality of characters to be efficiently changed in the case where wearable items are different for each character.

In order to attain the object described above, for example, the following configuration examples are exemplified.

A configuration example is directed to a non-transitory computer-readable storage medium having stored therein instructions that, when executed by a processor of an information processing apparatus, cause the information processing apparatus to: in a first mode, arrange a plurality of game objects whose appearance changes in accordance with an item object to be worn, in a virtual space such that the plurality of game objects are simultaneously displayed on a display section; designate an image corresponding to at least one type of the item object among a plurality of types of the item objects, as a designation object on the basis of an instruction from a user; when the designation object is designated, determine whether each of the plurality of game objects displayed on the display section is a wearing-possible game object that can wear the item object corresponding to the designation object, or a wearing-impossible game object that cannot wear the item object corresponding to the designation object; and regardless of the number of the wearing-possible game objects displayed on the display section, cause each wearing-possible game object to wear the item object corresponding to the designation object, and cause each wearing-impossible game object displayed on the display section not to wear the item object corresponding to the designation object.

According to the above configuration example, in the case of causing the plurality of game objects to wear the item object, it is possible to efficiently perform an operation or work for the wearing.

In another configuration example, each game object may have at least one wearing part, and each of the plurality of types of the item objects may be associated with at least one of the wearing parts. The wearing-possible game object may be caused to wear, on the wearing part associated with any of the plurality of types of the designation objects, the item object corresponding to the designation object.

In another configuration example, a plurality of game objects having the wearing parts on which the item objects can be worn and that are different from each other may be arranged in the virtual space such that the plurality of game objects are simultaneously displayed on the display section.

According to the above configuration example, even in the case where, between the plurality of game objects, there is a difference in part on which the item object can be worn, these game objects are simultaneously displayed on the display section. Therefore, an operation for causing these game objects to wear the item object can be performed at once without screen switching or the like. For example, when two game objects having such a difference therebetween are displayed, it is possible to cause both game objects to simultaneously wear the item object on a part on which both game objects can wear the item object, so that the convenience of the user can be enhanced. In addition, as for a part in which there is a difference between both game objects, at least an item object that can be worn on this part is worn on this part, so that the convenience of the user can be enhanced as compared with the case of making it impossible for both game objects to wear the item object.

In still another configuration example, the instructions may further cause the information processing apparatus to: in a second mode, arrange one of the game objects in the virtual space such that the one game object is displayed on the display section; make it impossible to designate the item object that cannot be worn by the one game object, and designate an image corresponding to at least one type of the item object among the plurality of types of the item objects, as a second mode designation object on the basis of an instruction from the user; and when the second mode designation object is designated, cause the one game object to wear the item object corresponding to the second mode designation object.

According to the above configuration example, a mode in which only one game object is set as a fitting target can also be provided, and it is possible to selectively use the modes in accordance with the situation of the game or the like. In addition, by making it impossible to designate the item object that cannot be worn, occurrence of an unnecessary wearing operation can be prevented, so that the convenience of the user can be enhanced.

In still another configuration example, the wearing-possible game object may be caused to wear an item object that is the item object corresponding to the designation object and that is treated as the same item between a plurality of the game objects.

According to the above configuration example, the amount of data for the item objects can be reduced.

In still another configuration example, the wearing-possible game object may be caused to wear an item object that is the item object corresponding to the designation object and that is different depending on the game object.

According to the above configuration example, by merely performing an operation for wearing a certain designation object, the game object can be caused to wear an item object different depending on the game object, so that the efficiency of an operation for causing a plurality of game objects to wear the item object can be increased.

In still another configuration example, the instructions may further cause the information processing apparatus to cause the wearing-impossible game object to make an action with respect to the wearing-possible game object when the wearing-possible game object is caused to wear the item object corresponding to the designation object.

According to the above configuration example, it is possible to clearly show the user that the wearing-impossible game object cannot wear the designation object. In particular, even when it is difficult for the user to visually recognize the item object since the size of the item object is small, it is easier for the user to grasp that the item object is not worn by the game object, through the movement of the game object.

In still another configuration example, the instructions may further cause the information processing apparatus to cause the wearing-possible game object to make a wearing action when causing the wearing-possible game object to wear the item object corresponding to the designation object.

According to the above configuration example, it is possible to display that the designation object is worn, such that the user easily grasps that the designation object is worn. In particular, even when it is difficult for the user to visually recognize the worn item object since the size of the item object is small, it is shown that the item object is worn, by the movement of the game object, so that it is easier for the user to recognize whether the item object is worn by the game object.

In still another configuration example, even when the number of the wearing-possible game objects displayed on the display section exceeds the number of the item objects owned by the user and corresponding to the designation objects, the item objects may be caused to be worn on all the wearing-possible game objects.

According to the above configuration example, each game object can be caused to wear various item objects, regardless of the item object owned state of the user.

In still another configuration example, when the designation object is designated, if the plurality of game objects displayed on the display section include the wearing-impossible game object that cannot wear the designation object, the wearing-impossible game object may be caused to wear a predetermined item object that can be worn by the wearing-impossible game object.

In still another configuration example, the game object arranged in the virtual space may be replaced with another game object. When the replacement with the other game object is performed, the other game object may be automatically caused to wear the item object worn by the game object immediately before the replacement and corresponding to the designation object.

According to the above configuration example, the game object can be changed, and, when the game object is changed, the game object wearing state before the change can be adopted for the game object after the change. Therefore, an operation for wearing does not have to be performed again after the change, so that the convenience of the user can be improved.

In still another configuration example, the plurality of game objects may include a player object and a non-player object.

According to the above configuration example, not only the player object that is to be a direct operation target for the user but also the non-player object can be displayed together on the display section. Therefore, the player object and the non-player object can be caused to wear the game object at once. Accordingly, the convenience of the user and the efficiency of operation can be enhanced.

According to the exemplary embodiments, the convenience of the user when causing a plurality of game objects to wear an item object can be improved.

BRIEF DESCRIPTION OF THE DRAWINGS

FIG. 8 illustrates a non-limiting example of the data structure of clothing item data 302;

FIG. 9 illustrates a non-limiting example of the data structure of type definition data 303;

FIG. 10 illustrates a non-limiting example of the data structure of PC wearing state data 306;

DETAILED DESCRIPTION OF NON-LIMITING EXAMPLE EMBODIMENTS

Hereinafter, one exemplary embodiment will be described. It is to be understood that, as used herein, elements and the like written in a singular form with a word "a" or "an" attached before them do not exclude those in the plural form.

[Hardware Configuration of Information Processing Apparatus]

First, the configuration of an information processing apparatus according to the exemplary embodiment will be described. In the exemplary embodiment, for example, a smart device such as a smartphone and a tablet, a game apparatus such as a stationary game apparatus and a handheld game apparatus, a personal computer, or the like is assumed as an information processing apparatus 102. In the following description, an information processing apparatus (for example, a smartphone) including a display screen and a touch panel that are integrated with each other will be described as an example. Therefore, input operations are mainly inputs to the touch panel. However, in another exemplary embodiment, for input operation, a physical controller connected to an information processing apparatus 102 wirelessly or via wire may be employed, or for example, an input apparatus formed integrally with the information processing apparatus 102 may be employed.

Figure 1:
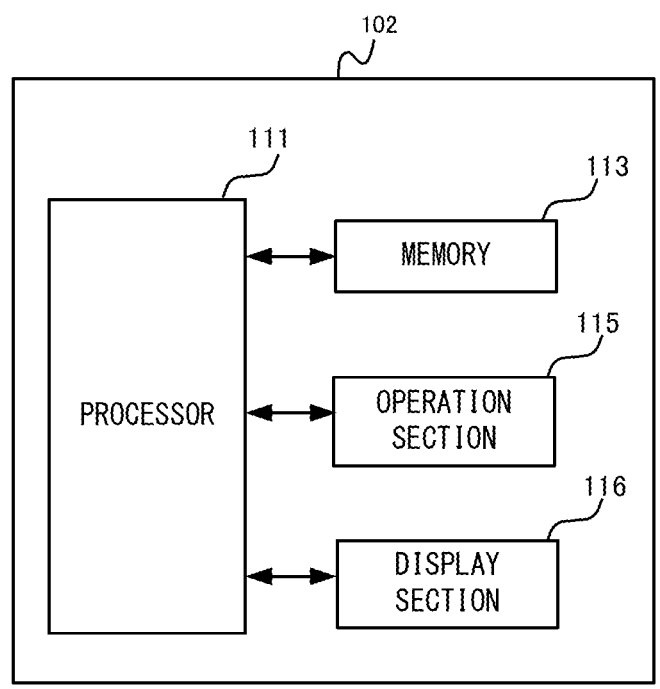
FIG. 1 is a block diagram showing a non-limiting example of the configuration of an information processing apparatus 102.
Figure 2:
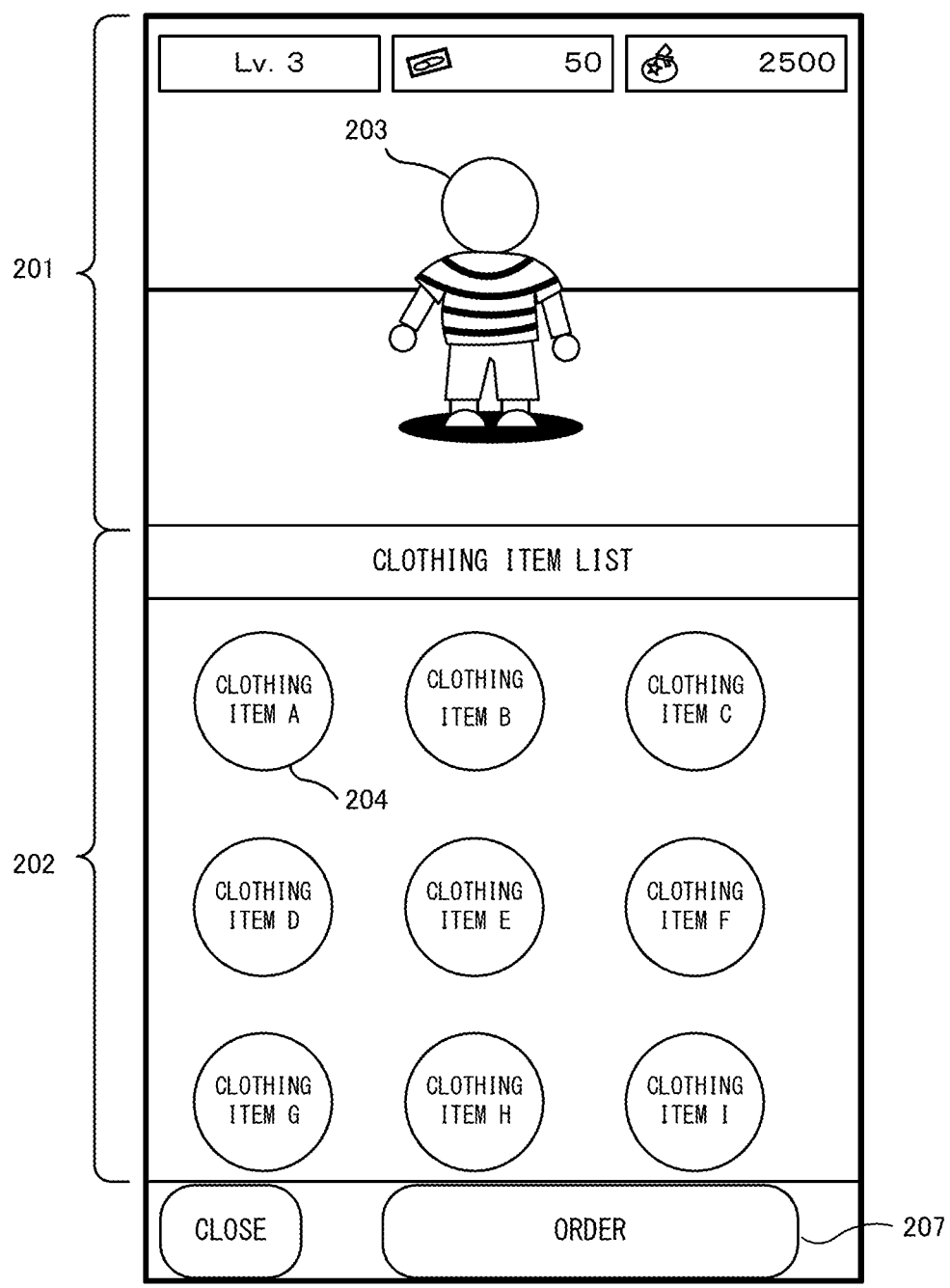
FIG. 2 illustrates a non-limiting screen example of a first fitting scene.

FIG. 2 is a functional block diagram of the information processing apparatus 102. In FIG. 2, the information processing apparatus 102 includes a processor 111, a memory 113, an operation section 115, and a display section 116. The processor 111 controls operation of the information processing apparatus 102 by executing information processing described later, or by executing a system program (not shown) for controlling overall operation of the information processing apparatus 102. The processor 111 may include a single processor or a plurality of processors. Various kinds of programs to be executed by the processor 111 and various kinds of data to be used in the programs are stored in the memory 113. The memory 113 is, for example, a flash EEPROM or a hard disk device. The operation section 115 is, for example, an input device for receiving an operation from a user. The display section 116 is typically a liquid crystal display device. In the processing according to the exemplary embodiment, a touch panel integrated with a liquid crystal screen is assumed as the operation section 115 and the display section 116. In another exemplary embodiment, a predetermined pointing device other than a touch panel may be used as the operation section 115.

Outline of Game Processing According to Exemplary Embodiment

Next, the outline of information processing executed in the exemplary embodiment will be described. In the exemplary embodiment, game processing will be described as an example of the information processing. First, the outline of a game realized by the game processing will be described. The game assumed in the exemplary embodiment is a game in which a user virtually lives as a player character (hereinafter, referred to as PC) in a virtual game world in which various virtual characters (hereinafter, referred to as NPCs) live. For example, the user can collect various material items and build their own house, or can maintain their garden. In addition, the user can acquire various items by harvesting, fishing, or the like, in the game, or by having a conversation with an NPC or the like. In this game, a clothing object (hereinafter, referred to as a clothing item) can be produced by consuming the material item. The clothing item can be worn by a PC or an NPC. By wearing the clothing item, the appearance of the PC or the NPC can be changed. In addition, in the exemplary embodiment, it is possible to change the clothing item to be worn by the PC or NPC, through "clothing change".

Here, in the exemplary embodiment, "parts" on which clothing items are to be worn are defined for the PC and the NPCs. As an example, in the exemplary embodiment, six parts, "head", "face", "upper body", "lower body", "ankle", and "foot" are defined. Moreover, in the exemplary embodiment, the clothing items are classified into a plurality of types (categories). As an example, the case where the clothing items are classified into six types of "headgear", "glasses", "tops", "bottoms", "socks", and "shoes" is taken as an example. Furthermore, in the exemplary embodiment, a part to be worn on (hereinafter, to-be-worn-on part) is set for each of these types. Specifically, in the case where the type is "headgear", "head" is set as the to-be-worn-on part. In the case where the type is "glasses", "face" is set as the to-be-worn-on part. In the case where the type is "tops", "upper body" is set as the to-be-worn-on part. In the case where the type is "bottoms", "lower body" is set as the to-be-worn-on part. In the case where the type is "socks", "ankle" is set as the to-be-worn-on part. In the case where the type is "shoes", "foot" is set as the to-be-worn-on part.

In the exemplary embodiment, a difference in parts on which items can be worn is provided between the PC and the NPCs. Specifically, the PC can wear predetermined clothing items on all the six parts, but each NPC can wear predetermined clothing items only on three parts, "head", "face", and "upper body" in principle. That is, each NPC cannot wear clothing items on "lower body", "ankle", and "foot".

Meanwhile, in the exemplary embodiment, as one of the means for the PC to obtain the above clothing item, there is means for passing a predetermined material to an NPC having the roll of a "clothing craftsman/craftswoman" and giving an "order" to produce a desired clothing item, to the NPC. After ordering, when a predetermined time has passed, the PC can obtain the ordered clothing item. At the time of such an order, in the exemplary embodiment, it is also possible to preview a state where the PC or an NPC wears a predetermined clothing item, through "fitting" before ordering. In the exemplary embodiment, in this "fitting", all costumes that appear in the game can be selected as items to be tried on, regardless of whether or not the items to be tried on are actually owned by the PC (user).

In the exemplary embodiment, as for the "fitting", two fitting modes are provided to the user. In the first mode (hereinafter, referred to as a first fitting mode), the clothing item can be tried on one PC or NPC alone. In the second mode (hereinafter, referred to as a second fitting mode), the clothing item can be tried on a plurality of characters at once. It is possible to transit to these modes from a predetermined screen by the user performing a predetermined operation. For example, a "fitting room" button is presented to the user in a screen for ordering the clothing item, and it is possible to transit to a screen for a fitting (hereinafter, referred to as a "fitting scene") (through a scene of entering a fitting room) by the user operating this button. At this time, it is possible to transit to either fitting mode by causing the user to select which to enter, a "first fitting room" for the first fitting mode or a "second fitting room" for the second fitting mode. Hereinafter, each mode will be described with reference to screen examples.

FIG. 2 illustrates a screen example of a fitting scene in the first fitting mode. Here, an example in which the PC is set as a fitting target character is shown. In the screen example shown in FIG. 2, a character display region 201 and a clothing item list region 202 are included. The character display region 201 is a region in which a fitting target character is displayed, and only a PC 203 is displayed in FIG. 2. In the exemplary embodiment, the fitting target character is represented as a 3D object. In addition, in FIG. 2, the PC 203 is wearing a "T-shirt A" which is one item of tops and "pants A" which is one item of bottoms. The clothing item list region 202 is a scrollable region in which icon images (hereinafter, clothing item icons) 204 corresponding to clothing items prepared in this game are displayed in a list format. In the example of FIG. 2, nine clothing item icons 204 for clothing items A to I are displayed. In FIG. 2, for convenience, each clothing item icon 204 is shown by a circle, but an appearance image of each clothing item is actually displayed as each clothing item icon 204. Moreover, instead of the specific appearance image, a character string indicating the name of each clothing item may be displayed as the clothing item icon 204. In addition, for example, the clothing item icon 204 may be presented in the form of a hyperlink. That is, any image (including the case of only a character string) may be displayed as each clothing item icon 204 as long as a specific clothing item can be specified. Also, in this example, the case where all the clothing items that appear in the game are displayed in a list in the clothing item list region 202 is taken as an example. However, in another exemplary embodiment, only the clothing items that can be ordered at that time (clothing items for which materials for creation are ready) may be displayed in the clothing item list region 202.

Figure 3:
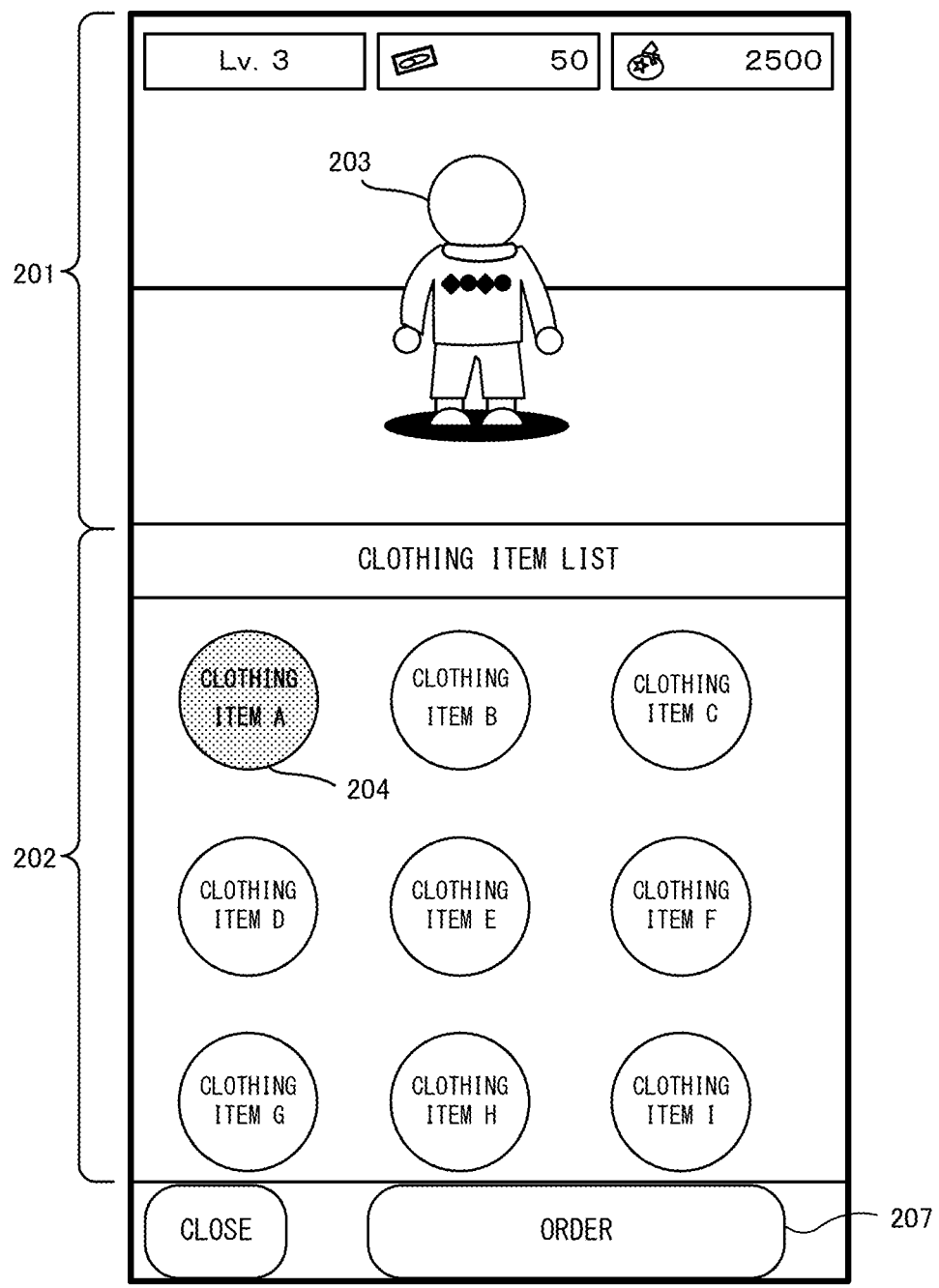
FIG. 3 illustrates a non-limiting screen example of the first fitting scene.

Here, an example of an operation for fitting will be described. In the state of FIG. 2, it is assumed that the user performs a tap operation on the clothing item icon 204 for the "clothing item A" in the clothing item list region 202. Then, as shown in FIG. 3, the display form of the clothing item icon 204 on which the tap operation has been performed is changed into a "selected state", and the appearance of the PC 203 in the character display region 201 is changed such that the PC 203 wears this clothing item in the selected state. That is, this clothing item in the selected state can be "tried on". In the exemplary embodiment, at the time of this fitting, a representation for changing the clothing item is performed by an action that the PC 203 makes one lateral rotation and the clothing item is changed before and after this rotation. In the following description, this representation is referred to as a "clothing-change representation", and this action is referred to as a "clothing-change action". In this example, the clothing item A is a "sweater A", which is one item of tops. That is, in the example of FIG. 3, a state where the PC 203 has changed from the "T-shirt A" to the "sweater A" (has tried the "sweater A" on) is shown. As described above, in the first fitting mode, one character is set as a fitting target, and caused to try a predetermined clothing item on. In this example, the PC 203 is set as a fitting target, but, as a matter of course, it is also possible to set an NPC 211 as a fitting target (on the basis of a predetermined operation or the like).

Moreover, in the exemplary embodiment, when the fitting target is changed, the fitting state immediately before is maintained unless the same type of clothing item is changed. For example, when an instruction to try on a clothing item whose type is a type other than tops is made in a state where the sweater A has been tried on, the other clothing item can be tried on with the sweater A being worn.

Next, the second fitting mode will be described. In the second fitting mode, a plurality of characters can be caused to simultaneously try a clothing item on. Here, an example in which two characters, one PC and one NPC, are set as simultaneous fitting targets will be described. However, in another example, three or more characters may be set as simultaneous fitting targets. In addition, such characters are not limited to a combination of the PC 203 and the NPC 211, and a plurality of only NPCs may be set as simultaneous fitting targets.

Figure 4:
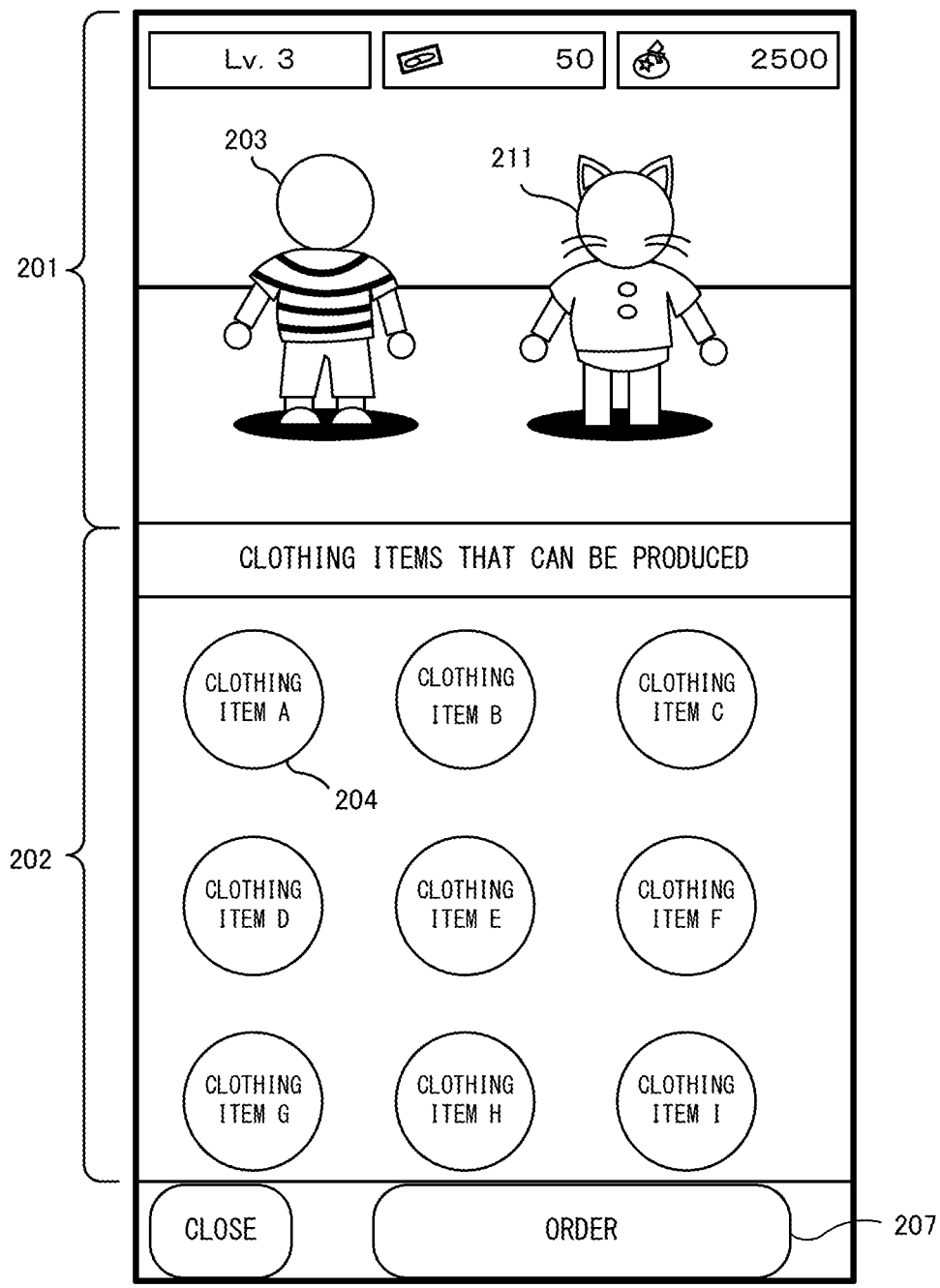
FIG. 4 illustrates a non-limiting screen example of a second fitting scene.
Figure 5:
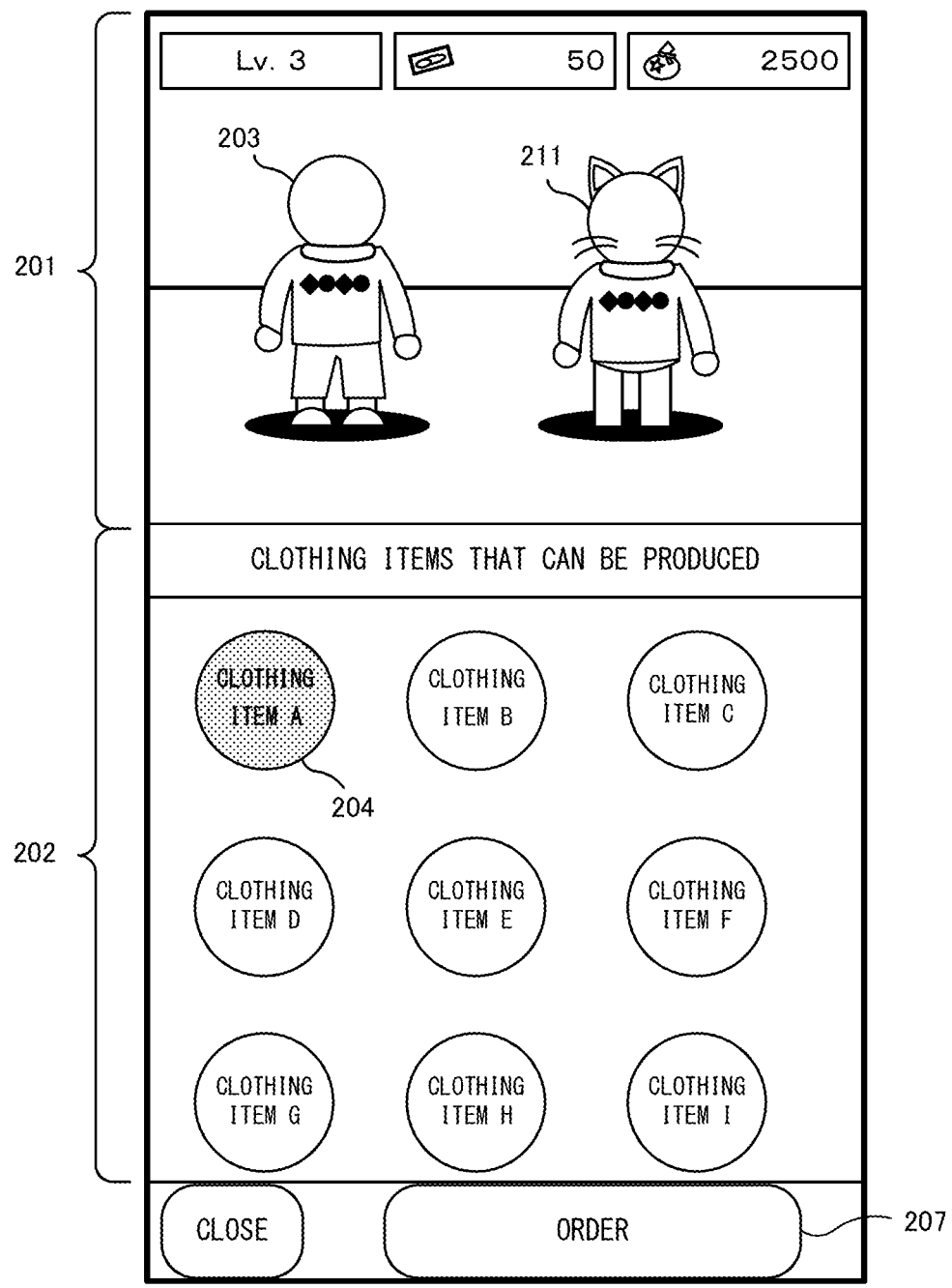
FIG. 5 illustrates a non-limiting screen example of the second fitting scene.
Figure 6:
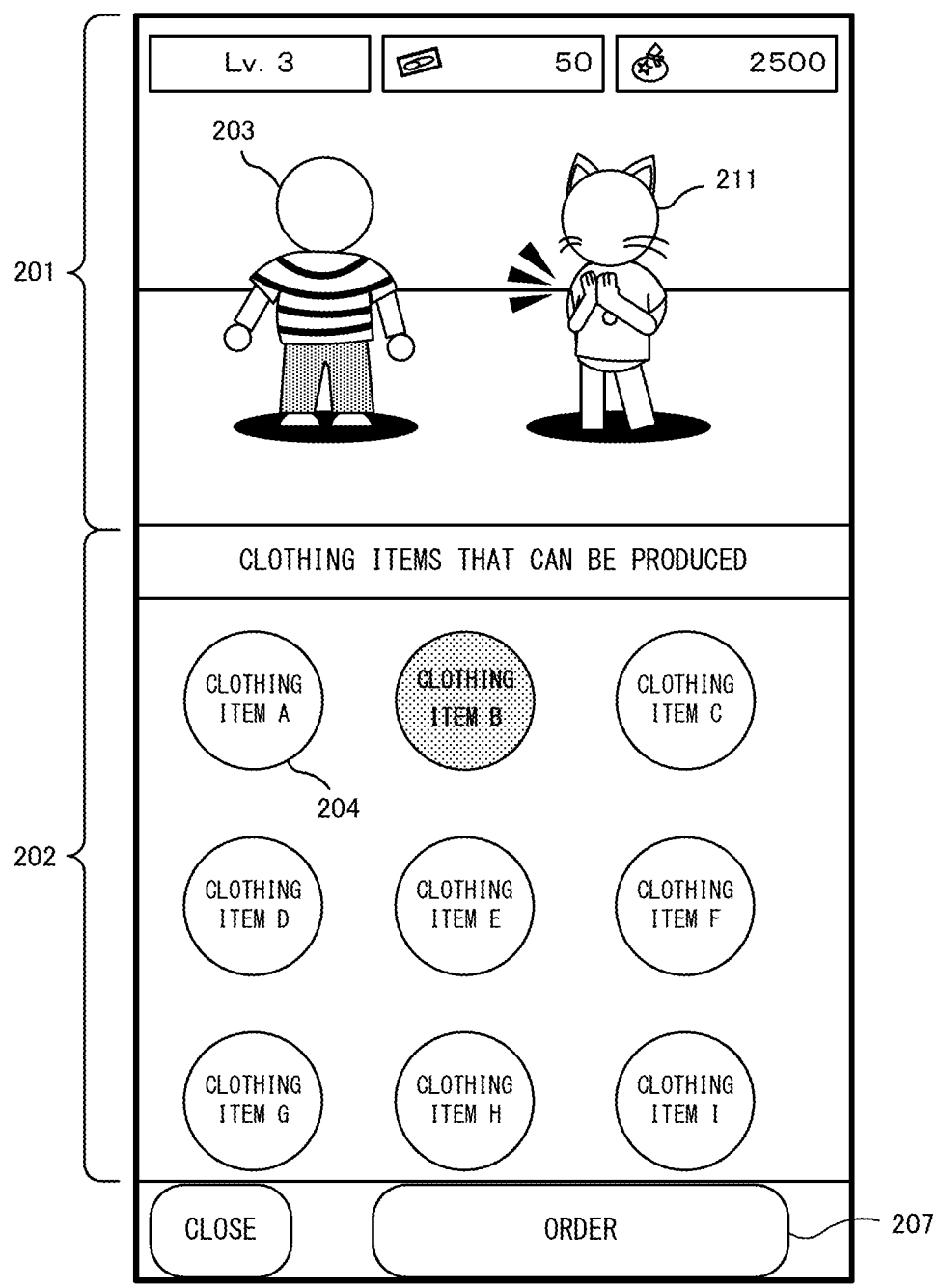
FIG. 6 illustrates a non-limiting screen example of the second fitting scene.

FIG. 4 illustrates a screen example in the second fitting mode. In FIG. 4, the PC 203 is wearing the "T-shirt A", which is one item of tops, and the "pants A", which is one item of bottoms, and the NPC 211 is wearing a "hemp shirt Z" which is one item of tops. It is assumed that, in this state, an operation for trying the "sweater A" on is performed. The sweater A is a clothing item that can be worn by both the PC 203 and the NPC 211. In this case, both the PC 203 and the NPC 211 make the "clothing-change action" described above as a clothing-change representation, and an image in which both the PC 203 and the NPC 211 wear the sweater A is displayed as shown in FIG. 5.

Here, it is assumed that, in the state of FIG. 4, an operation for trying on "denims A" which is one item of bottoms is performed. The "denims A" is a clothing item that can be worn by the PC 203 but cannot be worn by the NPC 211 (since the NPC 211 cannot wear a clothing item on the lower body thereof). In this case, for the PC 203, the "clothing-change action" is performed, and a state where the PC 203 wears the "denims A" is obtained. On the other hand, for the NPC 211, the "denims A" is not worn. Furthermore, instead of the "clothing-change action", the NPC 211 makes an action of clapping their hands with respect to the PC 203 (hereinafter, referred to as a "clapping action"). In other words, when a fitting operation is performed for a clothing item that cannot be worn by the NPC 211, the NPC 211 reacts to the change of the clothing of the PC 203. Accordingly, it is possible to increase the familiarity with the NPC 211 and improve the entertainment characteristics of the game, as compared with the case where the NPC 211 is not caused to make any action. In addition, by causing the NPC 211 to make an action different from the "clothing-change action" as described above, it is possible to clearly show the user that the clothing item cannot be worn by the NPC 211.

The NPC 211 is, for example, a character that is set as a "partner", a "fellow character", or the like for the PC 203 in the game. For example, when the PC 203 moves in the game world, the NPC 211 moves so as to follow the PC 203. As the partner or fellow character, a plurality of characters can be set. In the exemplary embodiment, it is possible to change the NPC 211 set as the fitting target in the second fitting mode, to another NPC. Here, when change of the NPC in the second fitting mode is performed, the wearing state of the NPC 211 at that time is adopted for the NPC after the change. For example, when the NPC 211 is changed to another NPC in the state shown in FIG. 5, the state where the sweater A is worn is adopted, and the NPC after the change in a state where the NPC wears the sweater is displayed on the screen A.

By causing the PC 203 or the NPC 211 to try a predetermined clothing item on as described above, the user can confirm the wearing image thereof before ordering the clothing item. By setting a desired clothing item to a selected state and performing a tap operation on an "order" button 207 in FIG. 2, etc., production of this clothing item can be ordered.

As described above, in the exemplary embodiment, it is possible to cause a plurality of characters to simultaneously try a clothing item on in the second fitting mode. In this case, when a clothing item that cannot be worn by some characters is selected, the appearance of the characters that cannot wear the selected clothing item is not changed. Accordingly, the clothing of a plurality of characters between which there is a difference in parts on which items can be worn can be efficiently changed.

Details of Game Processing According to Exemplary Embodiment

Next, the game processing according to the exemplary embodiment will be described in more detail with reference to FIG. 7 to FIG. 13.

[Data to be Used]

Figure 7:
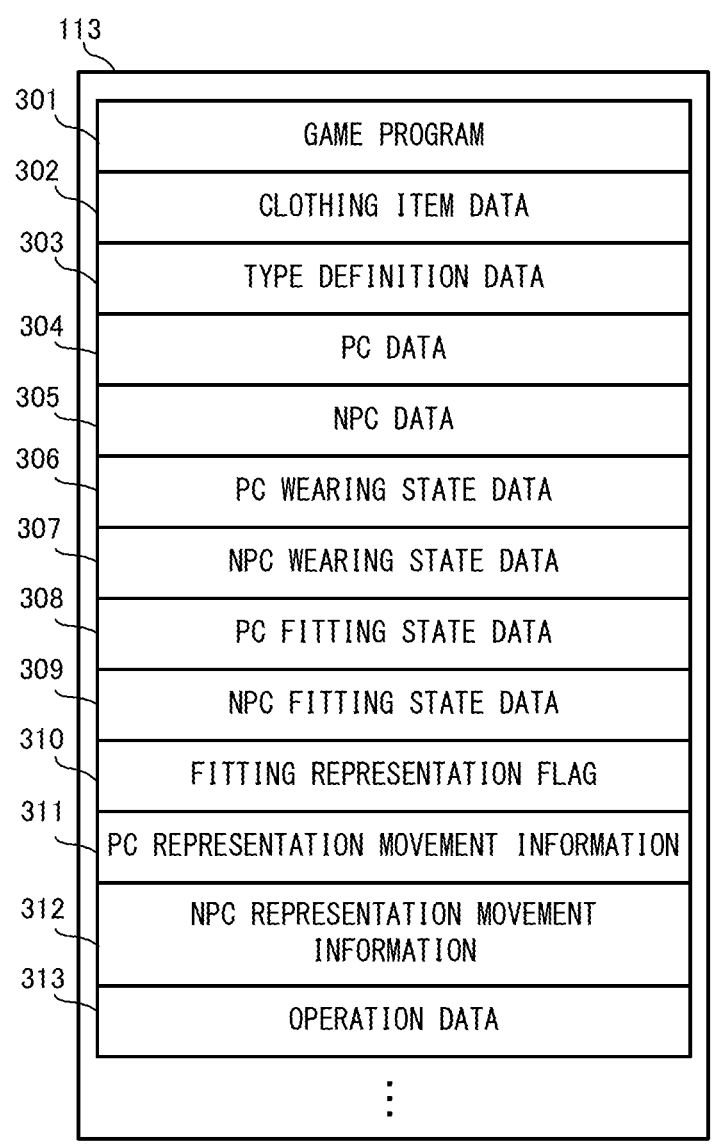
FIG. 7 illustrates a non-limiting example of a program and data stored in a memory 113 of the information processing apparatus 102.

First, various kinds of data to be used in the game processing will be described. FIG. 7 illustrates an example of a program and data stored in the memory 113 of the information processing apparatus 102. In the memory 113, a game program 301, clothing item data 302, type definition data 303, PC data 304, NPC data 305, PC wearing state data 306, NPC wearing state data 307, PC fitting state data 308, NPC fitting state data 309, a fitting representation flag 310, PC representation movement information 311, NPC representation movement information 312, operation data 313, etc., are stored.

The game program 301 is a game program for executing the game processing according to the exemplary embodiment. This program also includes a program (codes) for realizing the fitting scenes as described above.

The clothing item data 302 is data that defines each clothing item that appears in the game. FIG. 8 illustrates an example of the data structure of the clothing item data 302. The clothing item data 302 is data in a table format and has at least items such as a clothing item identification number 331, type information 332, and clothing item image data 333. The clothing item identification number 331 is an ID for uniquely identifying each clothing item. The type information 332 is information indicating which of the above-described six types the clothing item corresponds to. The clothing item image data 333 is image data of the clothing item. Here, as for the clothing item image data 333, in the exemplary embodiment, one image data is prepared for one clothing item, and an image of a wearing state of each of the PC 203 and the NPC 211 to be actually displayed on the screen is generated on the basis of this image data. Basically, the clothing item image data 333 is generated on the assumption that the corresponding clothing item is to be worn by the PC 203. When a wearing image of the NPC 211 is generated, an image of a wearing state of the NPC 211 is generated by subjecting this image to processing such as enlargement/reduction according to the body shape of the NPC 211. In another exemplary embodiment, a data structure in which PC image data and NPC image data are separately held may be adopted. For example, as for clothing "T-shirt A", the structure of data thereof has PC image data and NPC image data. In addition, in this case, a plurality of data exist as clothing item image data, but may be treated as the same "clothing" in the game.

In addition to the above, although not shown, for each clothing item, the clothing item data 302 also includes the name of the clothing item, information indicating the materials required for production of the clothing item, etc.

Referring back to FIG. 7, the type definition data 303 is data that defines an association between a type of clothing and a part on which the type of clothing can be worn. FIG. 9 illustrates an example of the data structure of the type definition data 303. The type definition data 303 is data in a table format and has at least items such as a type name 341, target part information 342, PC wearing enablement information 343, and NPC wearing enablement information 344. The type name 341 indicates the name of the above type of clothing. In this example, the case where the above six types are defined is taken as an example. The target part information 342 is information indicating which to-be-worn-on part the type of clothing is associated with (the specific contents of the association are as described above). The PC wearing enablement information 343 and the NPC wearing enablement information 344 are each information indicating whether or not it is possible to wear each type of clothing (on the to-be-worn-on part). In other words, the PC wearing enablement information 343 and the NPC wearing enablement information 344 are each data that defines whether the clothing item can be worn or cannot be worn on each to-be-worn-on part of the PC or NPC. Such a data definition method is an example, and, in another exemplary embodiment, data that defines whether the clothing item can be worn or cannot be worn on each part may be held separately from the type definition data 303. In this case, whether the clothing item can be worn or cannot be worn on each part may be individually defined for each of a plurality of NPCs. For example, an NPC-A can wear the clothing item on a lower body thereof, but an NPC-B cannot wear the clothing item on a lower body thereof. Moreover, in still another exemplary embodiment, the information indicating whether or not the clothing item can be worn by each character may be provided in the clothing item data 302.

Referring back to FIG. 7, the PC data 304 is data about the player character. The PC data 304 includes information indicating the appearance of the PC 203 (for example, 3D model data, texture data, etc.). In addition, the PC data 304 also includes various kinds of information required for the game processing, such as the name of the PC 203. The NPC data 305 is data that defines NPCs that appear in the game. Various kinds of information required for the game processing, such as information indicating the appearance of each NPC, the name of each NPC, and a role and movement contents in the game, are defined.

The PC wearing state data 306 is data indicating the clothing item wearing state of the PC at the time when the fitting scene is started. In other words, the PC wearing state data 306 is data indicating the clothing item that is worn by the PC when the PC enters the "fitting room". Similarly, the NPC wearing state data 307 is data indicating the clothing item wearing state of the NPC at the time when the fitting scene is started. FIG. 10 illustrates an example of the data structure of the PC wearing state data 306. The PC wearing state data 306 is data in a table format having items such as part information 351 and wearing clothing item information 352. The part information 351 is information indicating the above-described six parts, and the wearing clothing item information 352 is information in which the clothing item identification number 331 of the clothing item worn on each part is stored. The NPC wearing state data 307 has the same data structure, and thus the description thereof is omitted. In another exemplary embodiment, information corresponding to the PC wearing state data 306 may be included in the PC data 304. Information corresponding to the NPC wearing state data 307 may also be included in the NPC data 305.

The PC fitting state data 308 is data indicating the current fitting state of the PC 203 in the fitting scene. That is, the PC fitting state data 308 is data indicating the clothing item being tried on, and an image to be displayed in the character display region 201 in the fitting scene can be generated on the basis of this data. The same applies to the NPC fitting state data 309, and the NPC fitting state data 309 is data indicating the current fitting state of the NPC (in the second fitting scene). The basic data structures of the PC fitting state data 308 and the NPC fitting state data 309 are the same as that of the PC wearing state data 306, and thus the description thereof is omitted.

The fitting representation flag 310 is data for indicating whether or not to make the above-described "clothing-change action" or "clapping action". In this example, while this flag is set to be ON, a process for displaying a representation action such as the "clothing-change action" or the "clapping action" is performed. The PC representation movement information 311 and the NPC representation movement information 312 are information indicating the contents of movements made by the PC 203 and the NPC 211 when the fitting representation flag 310 is ON. In the exemplary embodiment, information indicating the "clothing-change action" is constantly set in the PC representation movement information 311, and either the "clothing-change action" or the "clapping action" can be set in the NPC representation movement information 312. In addition, information indicating the motion of each action is included, and, in the case where the clothing item is changed (to another clothing item), information indicating the clothing item before the change and the clothing item after the change, etc., are also included. In another exemplary embodiment, for example, a plurality of patterns may be prepared for the "clothing-change action", and the "clothing-change actions" having different movements may be selectively used in accordance with the situation or the like of the game. In addition, as a movement in the case where the NPC 211 cannot wear the clothing item, a movement other than the "clapping action" may be able to be made. For example, various reactions to change of the clothing of the PC 203 such as thumbs-up movement and movement of delight with a smile may be defined in advance, and may be selectively used as appropriate.

The operation data 313 is data indicating the contents of various operations performed on the operation section 115. In the exemplary embodiment, the operation data 313 includes the presence/absence of an input to the touch panel as the operation section 115, data indicating a touch coordinate or the like of the input, data indicating pressed states of various buttons that are not shown, and the like. The contents of the operation data 313 are updated in predetermined cycles on the basis of a signal from the operation section 115.

In addition to the above, various kinds of data required for the game processing are generated as necessary and stored in the memory 113.

[Details of Game Processing]

Next, the game processing according to the exemplary embodiment will be described in detail with reference to flowcharts. Here, processing related to the above-described second fitting scene will be described, and the description of other game processing is omitted. As for the first fitting scene, basically, the processing thereof is processing that is obtained by omitting processing related to the NPC from the processing of the second fitting scene described below and in which only one character is arranged in a virtual space as a character to be displayed in the character display region 201.

Figure 11:
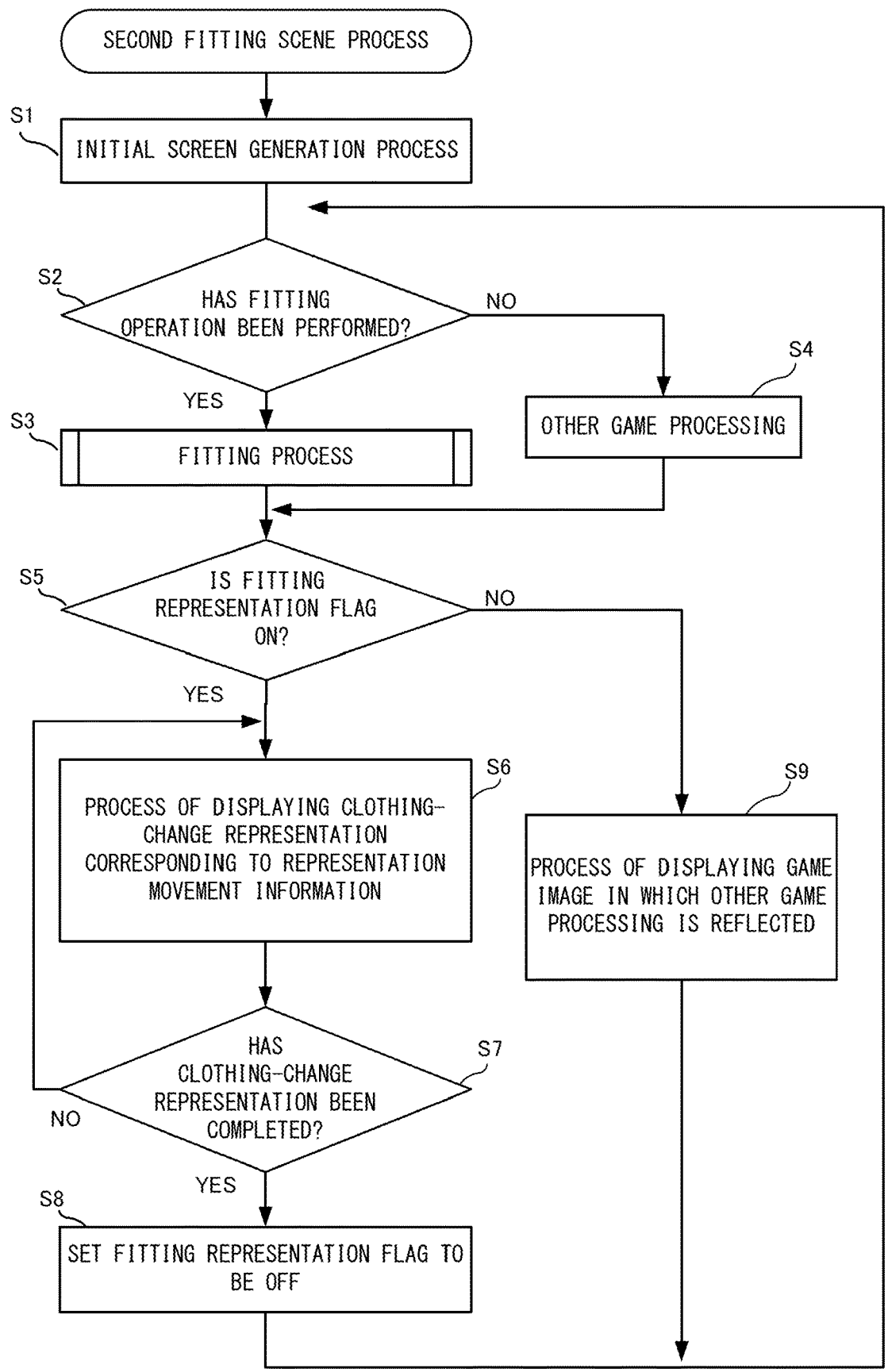
FIG. 11 is a flowchart showing a second fitting scene process in detail.

FIG. 11 is a flowchart showing a second fitting scene process in detail. When the user performs a predetermined operation for starting the second fitting scene, the process shown in FIG. 11 is started.

First, in step S1, the processor 111 executes an initial screen generation process. Specifically, the processor 111 initializes various kinds of data to be used in the second fitting scene process. Next, the processor 111 stores the clothing item wearing states of the PC 203 and the NPC 211 at the time when the process is started, as the PC wearing state data 306 and the NPC wearing state data 307. Then, the processor 111 generates the PC 203 and the NPC 211 on the basis of the wearing states at this time. Then, the processor 111 arranges the PC 203 and the NPC 211 within the virtual space, and sets an image thereof taken by a virtual camera, as a display content of the character display region 201. In addition, the processor 111 sets display contents of the clothing item list region 202, etc., as appropriate on the basis of the clothing item data 302, etc., and generates a second fitting scene image as shown in FIG. 4. Then, the processor 111 outputs the second fitting scene image to the display section 116, and waits for an operation of the user.

Next, in step S2, the processor 111 determines whether a fitting operation for making an instruction to try on any of the clothing items shown in the clothing item list region 202 has been performed, on the basis of the operation data 313. For example, the processor 111 determines whether a certain clothing item icon 204 (in an unselected state) has been selected from the clothing item list region 202. Hereinafter, a clothing item that is instructed to be tried on is referred to as a "designated clothing item". As a result of the determination, when the fitting operation has been performed (YES in step S2), the processor 111 executes a fitting process in step S3.

Figure 12:
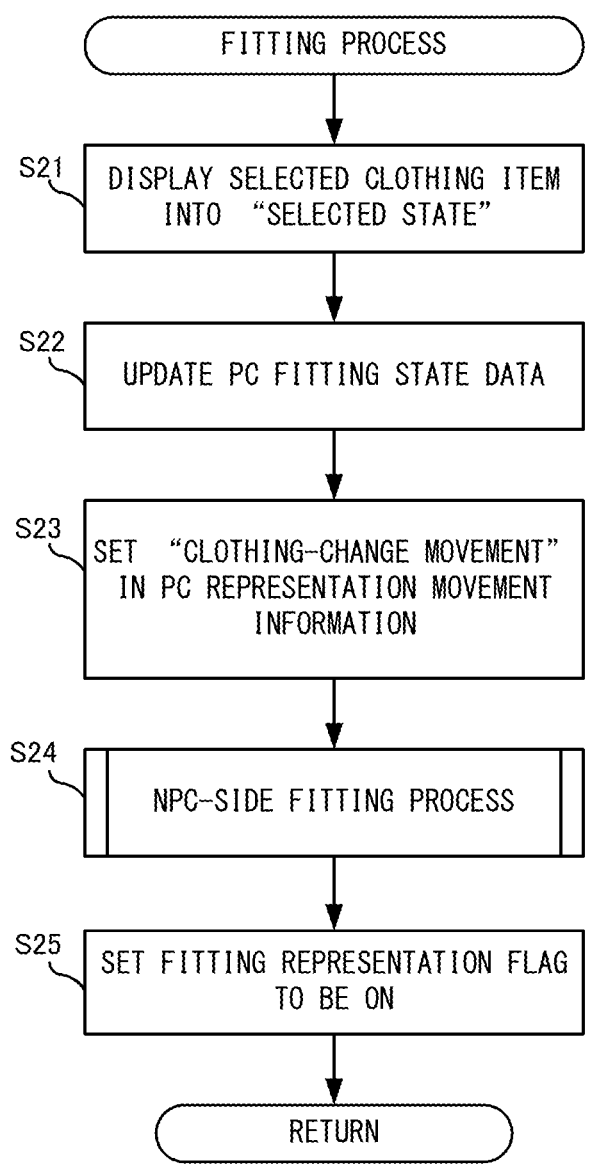
FIG. 12 is a flowchart showing a fitting process in detail.

FIG. 12 is a flowchart showing the fitting process in detail. In FIG. 12, in step S21, the processor 111 executes a process of setting the designated clothing item in the clothing item list region 202 to be in a "selected state". Specifically, the processor 111 performs setting in which the display form of the clothing item icon 204 for the designated clothing item is changed in the clothing item list region 202.

Next, in step S22, the processor 111 performs a process of updating the current wearing state of the PC. Specifically, the processor 111 sets information indicating the designated clothing item, in the PC fitting state data 308. A process is executed in which, as for a part on which a clothing item is tried on for the first time, information indicating the designated clothing item is added, and when the fitting instruction is an instruction for a part on which any clothing item has already been tried on, the information of the clothing item to be tried on is changed.

Next, in step S23, the processor 111 sets, in the PC representation movement information 311, various kinds of information for executing a "clothing-change action" in which the currently worn clothing item is changed to the currently designated clothing item.

Figure 13:
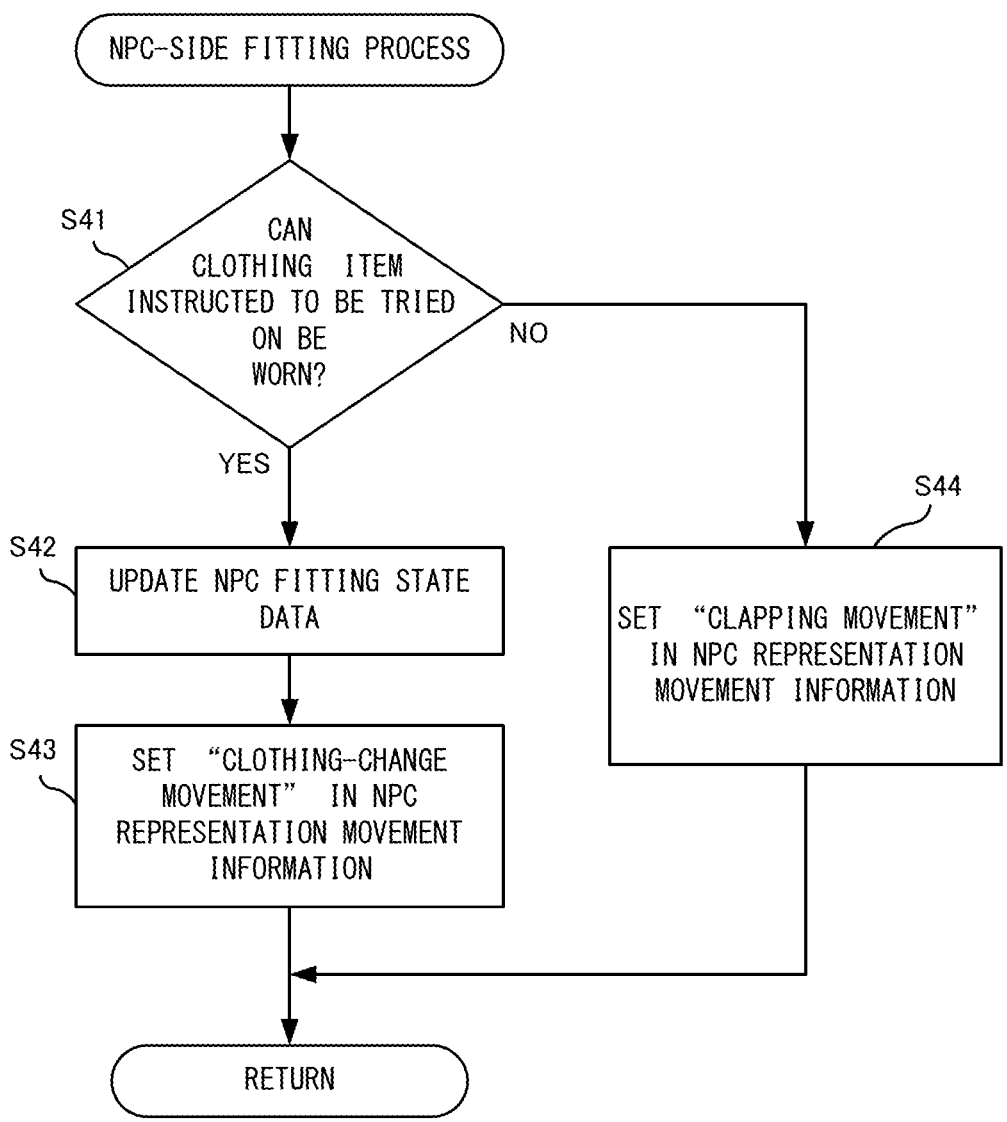
FIG. 13 is a flowchart showing an NPC-side fitting process in detail.

Next, in step S24, the processor 111 executes an NPC-side fitting process. FIG. 13 is a flowchart showing this process in detail. First, in step S41, the processor 111 determines whether the NPC as a fitting target can wear the designated clothing item, on the basis of the clothing item data 302 and the type definition data 303. For example, when the type of the designated clothing item is bottoms, it is determined that the NPC can wear the designated clothing item. As a result of the determination, when the NPC can wear the designated clothing item (YES in step S41), in step S42, the processor 111 performs a process of updating the current fitting state of the NPC 211. Specifically, the processor 111 updates the fitting state by setting information indicating the designated clothing item, in the NPC fitting state data 309. In subsequent step S43, the processor 111 sets information indicating the "clothing-change action" as described above, in the NPC representation movement information 312. As a result, when an instruction to try on the clothing item that can be worn by the NPC is made, the NPC 211 makes the same "clothing-change action" as the PC 203, as a clothing-change representation.

On the other hand, as a result of the determination in step S41, when the NPC 211 cannot wear the designated clothing item (NO in step S41), in step S44, the processor 111 sets information indicating the "clapping action", in the NPC representation movement information 312 without changing the fitting state of the NPC 211 (with the current state maintained). As a result, when an instruction to try on a clothing item that cannot be worn by the NPC is made, the NPC 211 makes an action of clapping their hands with respect to the PC 203, as a clothing-change representation. This is the end of the NPC-side fitting process.

Referring back to FIG. 12, next, in step S25, the processor 111 sets the fitting representation flag 310 to be ON. This is the end of the fitting process.

Referring back to FIG. 11, next, the case where, as a result of the determination in step S2, the fitting operation has not been performed (NO in step S2), will be described. In this case, in step S4, the processor 111 executes other game processing on the basis of the operation content indicated by the operation data 313. As this processing, for example, the following process is performed. First, when an operation for "ordering" the clothing item that has been tried on has been performed, a process for producing the clothing item is executed as appropriate. In addition, when an instruction to "take off" the clothing item that has been tried on has been performed, the PC fitting state data 308 and the NPC fitting state data 309 are updated such that the wearing of the clothing item is canceled. At this time, a process of returning the display form of the clothing item icon 204 changed to be in the "selected state" to the original form is also performed. In addition, when an operation for changing the NPC as the fitting target has been performed, a process of changing the NPC 211 as the fitting target is performed on the basis of the content of this operation. At this time, the content of the NPC fitting state data 309 (that is, the fitting state at that time) is adopted as the clothing item wearing state of the NPC after the change. In addition, when an operation for scrolling the clothing item list region 202 has been performed, a process of scrolling this region is performed. Moreover, when an operation for ending the fitting scene has been performed, the processor 111 ends the second fitting scene process. In addition, game processing corresponding to the operation content is executed as appropriate.

Next, in step S5, the processor 111 determines whether the fitting representation flag 310 is ON. As a result of the determination, when the fitting representation flag 310 is ON (YES in step S5), in step S6, the processor 111 executes a processing of displaying a clothing-change representation based on the PC representation movement information 311 and the NPC representation movement information 312. That is, the processor 111 executes a process of causing the PC 203 and the NPC 211 to perform the clothing-change representation. Subsequently, in step S7, the processor 111 determines whether the clothing-change representation has been completed. When the clothing-change representation has not been completed (NO in step S7), the processor 111 returns to step S6 and continues the process of displaying the clothing-change representation. When the clothing-change representation has been completed (YES in step S7), next, in step S8, the processor 111 sets the fitting representation flag 310 to be OFF. Then, the processor 111 returns to step S2 and repeats the process.

On the other hand, as a result of the determination in step S5, when the fitting representation flag 310 is OFF (NO in step S5), in step S9, the processor 111 performs a process of generating a game image in which the result of the other game processing in step S4 is reflected, and displaying the game image. In this case, the appearance of the PC 203 and the NPC 211 displayed in the character display region 201 is based on the PC fitting state data 308 and the NPC fitting state data 309. Thereafter, the processor 111 returns to step S2 and repeats the process.

This is the end of the detailed description of the second fitting scene process according to the exemplary embodiment.

As described above, in the exemplary embodiment, the second fitting mode in which a plurality of characters can simultaneously try a clothing item on is provided. In the second fitting mode, when a clothing item that can be worn by a plurality of characters among the simultaneous fitting targets is tried on, the "clothing-change action" is performed for the characters that try the clothing item on, and the clothing of the characters is changed. On the other hand, when a clothing item that cannot be worn by the NPC 211 is tried on, the NPC 211 is not caused to wear this clothing item, and is further caused to make an action different from the "clothing-change action". Accordingly, while improving the efficiency of preview by allowing a plurality of characters to try a clothing item on at once, it is also possible to clearly present, to the user, clothing items that can be worn by each character and clothing items that cannot be worn.

[Modifications]

In the above-described embodiment, the example in which all the clothing items are displayed in the clothing item list region 202 as clothing items that can be tried on, has been shown. In another exemplary embodiment, only the clothing items owned by the PC 203 may be set as clothing items to which the clothing can be changed. In this case, only the clothing item icons 204 corresponding to the clothing items owned by the PC 203 may be displayed in the clothing item list region 202. Alternatively, the clothing item icons 204 corresponding to the clothing items that are not owned by the PC 203 may be displayed in the clothing item list region 202 so as to be grayed out such that these clothing item icons 204 cannot be selected. In addition, the clothing items owned by the PC 203 may be worn by all the fitting target characters regardless of the number of clothing items owned by the PC 203. For example, even when the number of clothing items owned by the PC 203 is only one, both the PC 203 and the NPC 211 may be caused to wear this one owned clothing item in the second fitting mode.

In the above embodiment, the example in which the PC 203 can wear all the clothing items has been shown. However, in another exemplary embodiment, a clothing item that cannot be worn by the PC 203 may be set. In this case, similar to the case of the NPC 211, a process of determining whether a clothing item instructed to be tried on can be worn by the PC 203 may be performed. When the clothing item cannot be worn by the PC 203, the PC 203 may be caused to make a predetermined action corresponding to the fact that the clothing item cannot be worn by the PC 203, such as the "clapping action".

Figure 14:
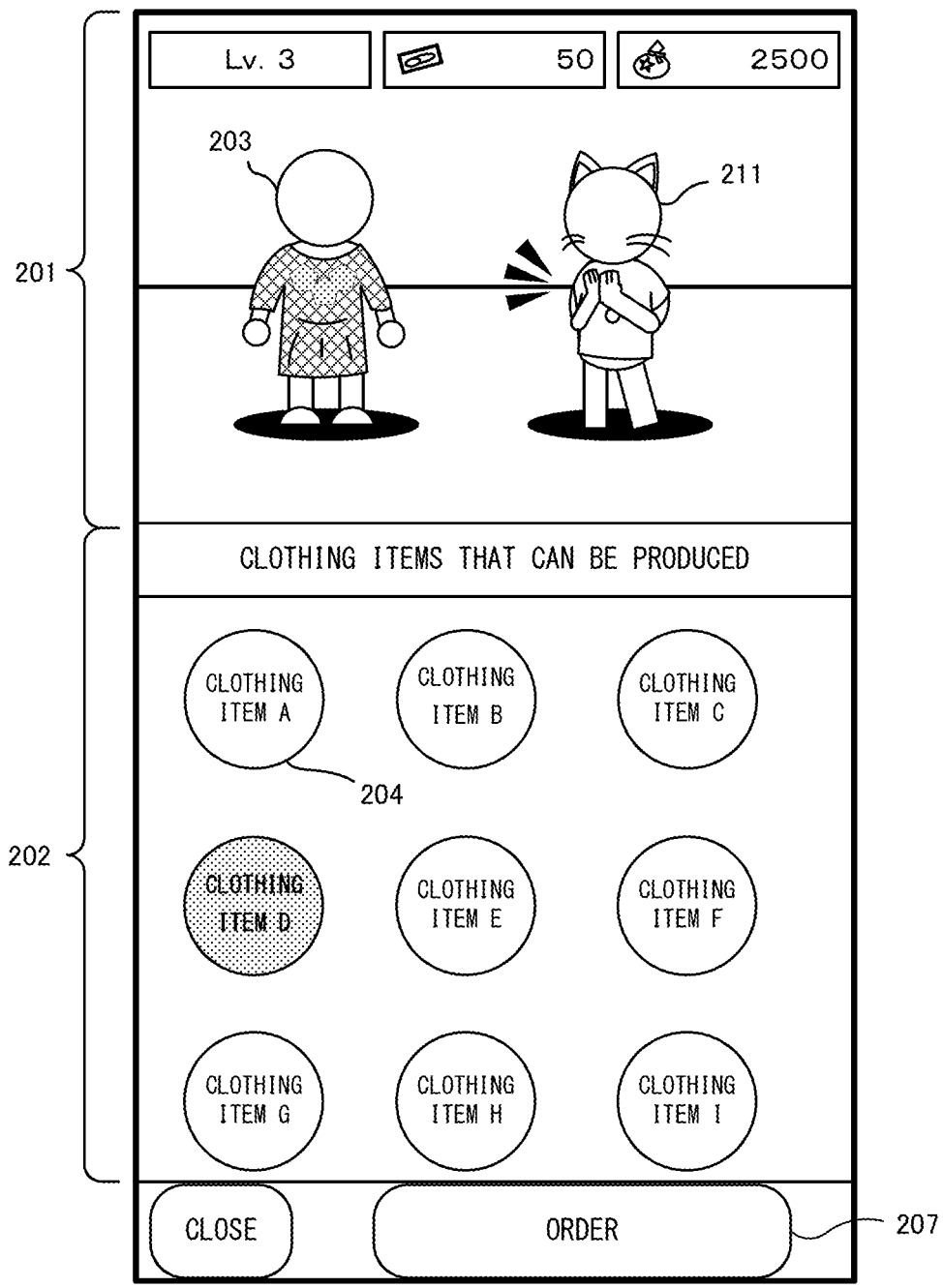
FIG. 14 illustrates a non-limiting screen example of the second fitting scene.

In the above embodiment, the example in which clothing items each of which is to be worn only on any one of the parts has been described as an example of the clothing items. In another exemplary embodiment, a clothing item that is to be worn on a plurality of parts may be used. For example, a type of clothing called "one-piece dress" for which the to-be-worn-on parts are set as "upper body" and "lower body" may be defined. As for the "one-piece dress", the to-be-worn-on parts include lower body, but each NPC cannot wear a clothing item on the lower body thereof as described above, and thus the "one-piece dresses" cannot be worn by the NPC. Here, the case where an instruction to try on a clothing item that is a "one-piece dress" is performed from the state shown in FIG. 5 is assumed. In this case, as shown in FIG. 14, the PC 203 may wear a clothing item that is a "one-piece dress", on the upper body and the lower body thereof, but the clothing of the NPC 211 may be returned to the clothing item at the time of start of the fitting scene (the clothing in FIG. 4). As for this point, if the NPC 211 is kept in a state where the NPC 211 tries the sweater A on (as in FIG. 5), the clothing item being tried on a part (upper body in this case) on which a clothing item can be worn is different between the PC 203 and the NPC 211, so that there is a possibility that it is difficult for the user to recognize which clothing item is being tried on. Therefore, when an instruction to try on a clothing item that cannot be worn by each NPC and that affects another part has been performed, the clothing of the NPC 211 is returned to the clothing item in the initial state. That is, the NPC 211 is brought into a state where the NPC 211 wears a clothing item that can be worn by the NPC 211. In still another exemplary embodiment, in this case, the NPC 211 may be brought into a state where no clothing item is worn on this part.

In still another exemplary embodiment, instead of the "to-be-worn-on parts" and the "types" of clothing, whether each clothing item can be worn may be managed for each character or the like. In addition, the above process may be applied to a game in which, instead of the "clothing item" described above, a predetermined item is "provided" or "mounted". For example, a game in which a plurality of characters form a party, such as a role-playing game, is assumed. The above-described process may be applied to equipment such as weapons and armors. In this case, a plurality of party members are displayed in the character display region 201. When an instruction to try a certain weapon on has been performed, the appearance image of only a character that can be equipped with this weapon may be changed. In this case, whether the equipment can be worn may be set for each character, or, for example, an "occupation" is defined for each character, and whether the equipment can be worn may be managed for each occupation. Examples of the "occupation" include "warrior" and "wizard". When a weapon whose type is "sword" is tried on, the weapon may be tried on only by the "warrior", and, when a weapon whose type is "wand" is tried on, the weapon may be tried on only by the "wizard".

In the above embodiment, for example, when a certain clothing item icon 204 is selected from the clothing item list region 202, the clothing item corresponding to this clothing item icon 204 is one clothing item that can be shared by the PC and the NPC. For example, when the clothing item icon 204 for the "sweater A" is selected, the "sweater A" that is the same clothing item is worn by the PC 203 and the NPC 211. In another exemplary embodiment, when one clothing item icon 204 is selected, different clothing items may be worn by the PC 203 and the NPC 211. As an example, first, it is assumed that a clothing item icon 204 with a character string "animal T-shirt" is shown in the clothing item list region 202. In addition, it is assumed that the NPC 211 that is a fitting target is a character representing "cat" or "dog". In such a case, when an instruction to try an "animal T-shirt" on is made, if the NPC is a "dog" NPC, a "T-shirt X" having a dog face mark printed thereon may be worn by the NPC, and if the NPC is a "cat" NPC, a "T-shirt Y" having a cat face mark printed thereon may be worn by the NPC. In this case, the "T-shirt X" and the "T-shirt Y" may be treated as different clothing items (different items) in the game. In addition, the different clothing items may have some similarity in appearance. For example, the shape and pattern are the same, but the colors are different between the different clothing items. As a matter of course, clothing items that are worn as a result of designation of the same clothing item icon 204 but have no similarity in appearance may be worn.

In the above embodiment, the case where the series of processes according to the game processing are performed in a single apparatus has been described. However, in another embodiment, the above series of processes may be performed in an information processing system that includes a plurality of information processing apparatuses. For example, in an information processing system that includes a terminal side apparatus and a server side apparatus capable of communicating with the terminal side apparatus via a network, a part of the series of processes may be performed by the server side apparatus. Alternatively, in an information processing system that includes a terminal side apparatus and a server side apparatus capable of communicating with the terminal side apparatus via a network, a main process of the series of the processes may be performed by the server side apparatus, and a part of the series of the processes may be performed by the terminal side apparatus. Still alternatively, in the information processing system, a server side system may include a plurality of information processing apparatuses, and a process to be performed in the server side system may be divided and performed by the plurality of information processing apparatuses.

In addition, a so-called cloud gaming configuration may be adopted. For example, the information processing apparatus 102 may be configured to send operation data indicating a user's operation to a predetermined server, and the server may be configured to execute various kinds of game processing and stream the execution results as video/audio to the information processing apparatus 102.

While the exemplary embodiments have been described in detail, the foregoing description is in all aspects illustrative and not restrictive. It is to be understood that numerous other modifications and variations can be devised without departing from the scope of the exemplary embodiments.

What is claimed is:

1. A non-transitory computer-readable storage medium having stored therein instructions that, when executed by a processor of an information processing apparatus, cause the information processing apparatus to perform operations comprising:
    arranging a plurality of game objects whose appearance automatically changes in accordance with an item object to be worn in a virtual space, wherein the plurality of game objects are simultaneously displayed on a display screen;
    displaying, concurrently with the plurality of game objects, a plurality of item objects;
    receiving, via a user input device, a designation instruction that designates a first item object from among the plurality of item objects;
    based on designation of the first item object:
        (a) determining whether each of the plurality of game objects that are being simultaneously displayed on the display screen can wear the first item object or cannot wear the first item object, wherein those ones of the plurality of game objects that can wear the first item object are each classified as a target wearable object and those ones of the plurality of game objects that cannot wear the first item object are each classified as a target non-wearable object;
        (b) for each classified target wearable object, including in cases where there are multiple target wearable objects that have been classified, automatically updating how each one of the plurality of game objects that corresponds to a respective target wearable object is displayed by causing the corresponding one to wear the first item object corresponding that has been designated, wherein any target non-wearable objects are not changed to wear first item object corresponding that has been designated; and
        (c) for each corresponding game object of the plurality of game objects that are classified as target non-wearable objects, animating the corresponding game object to perform, within the virtual space, an action with respect to the target wearable object when the target wearable object is caused to wear the first item object.

2. The storage medium according to claim 1,
    wherein each of the plurality of game objects has at least one wearing part,
    wherein each of the plurality of item objects is associated with one of the at least one wearing part, and
    wherein how each corresponding one of the plurality of game objects is automatically updated further includes applying the first item object to an associated at least one wearing part the corresponding one of the plurality of game objects.

3. The storage medium according to claim 2, wherein the plurality of game objects that have wearing parts on which item objects can be worn and that are different from each other are arranged in the virtual space the plurality of game objects are simultaneously displayed on the display screen.

4. The storage medium according to claim 1, wherein the operations further comprise:
in a another mode, arranging one of the game objects in the virtual space such that only one of the plurality of game objects is displayed on the display screen;
preventing an instruction that designates any of the plurality of item objects that cannot be worn by the one game object.

5. The storage medium according to claim 1, wherein each instance of the first item object that is used to update how each one of the plurality of game objects that corresponds to a respective target wearable object is displayed is further based on commonly stored data for the first item object.

6. The storage medium according to claim 1, wherein how each instance of the first item object is used to update how each one of the plurality of game objects that corresponds to a respective target wearable object is displayed to be wearing the first item object is different depending on the corresponding one of the game objects.

7. The storage medium according to claim 1, wherein the operations further comprise:
based on designation of the first item object:
for each corresponding one of the plurality of game objects that are classified as target wearable objects, causing the corresponding one to perform a wearing action, within the virtual space, when the corresponding one is caused to wear the first item object.

8. The storage medium according to claim 1, wherein, even when the number of the target wearable objects displayed on the display screen exceeds a number of the first item object that are owned, the first item object are caused to be worn by each target wearable object.

9. The storage medium according to claim 1, wherein the operations further comprise:
based on designation of the first item object:
for each classified target non-wearable object, automatically updating how each one of the plurality of game objects that corresponds to a respective target non-wearable object is displayed by causing the corresponding one to wear a predetermined item object that can be worn by the corresponding one.

10. The storage medium according to claim 1, wherein the operations further comprise:
receiving a replacement instruction to replace at least a first game object of the plurality objects with a second game object,
wherein, upon replacement, the second game object is automatically caused to wear the first item object worn by the first game object immediately before the replacement.

11. The storage medium according to claim 1, wherein the plurality of game objects include a player object and a non-player object.

12. An information processing apparatus comprising:
a processor and a memory coupled thereto, the processor being configured to control the information processing apparatus to perform operations comprising:
arranging a plurality of game objects whose appearance automatically changes in accordance with an item object to be worn in a virtual space, wherein the plurality of game objects are simultaneously displayed on a display screen;
displaying, concurrently with the plurality of game objects, a plurality of item objects;
receiving, via a user input device, a designation instruction that designates a first item object from among the plurality of item objects;
based on designation of the first item object:
(a) determining whether each of the plurality of game objects that are being simultaneously displayed on the display screen can wear the first item object or cannot wear the first item object, wherein those ones of the plurality of game objects that can wear the first item object are each classified as a target wearable object and those ones of the plurality of game objects that cannot wear the first item object are each classified as a target non-wearable object;
(b) for each classified target wearable object, including in cases where there are multiple target wearable objects that have been classified, automatically updating how each one of the plurality of game objects that corresponds to a respective target wearable object is displayed by causing the corresponding one to wear the first item object corresponding that has been designated, wherein any target non-wearable objects are not changed to wear first item object corresponding that has been designated; and
(c) for each corresponding one of the plurality of game objects that are classified as target non-wearable objects, causing the corresponding one to perform an action, within the virtual space, with respect to the target wearable object when the target wearable object is caused to wear the first item object.

13. A processing system comprising:
a memory storing computer executable instructions; and
a processor that is coupled to the memory, thereto, the processor being configured to execute the computer executable instructions to perform operations comprising:
arranging a plurality of game objects whose appearance automatically changes in accordance with an item object to be worn in a virtual space, wherein the plurality of game objects are simultaneously displayed on a display screen;
displaying, concurrently with the plurality of game objects, a plurality of item objects;
receiving, via a user input device, a designation instruction that designates a first item object from among the plurality of item objects;
based on designation of the first item object:
(a) determining whether each of the plurality of game objects that are being simultaneously displayed on the display screen can wear the first item object or cannot wear the first item object, wherein those ones of the plurality of game objects that can wear the first item object are each classified as a target wearable object and those ones of the plurality of game objects that cannot wear the first item object are each classified as a target non-wearable object;
(b) for each classified target wearable object, including in cases where there are multiple target wearable objects that have been classified, automatically updating how each one of the plurality of game objects that corresponds to a respective target wearable object is displayed by causing the corresponding one to wear the first item object corresponding that has been designated, wherein any target non-wearable objects are not changed to wear first item object corresponding that has been designated; and (c) for each corresponding one of the plurality of game objects that are classified as target non-wearable objects, causing the corresponding one to perform an action, within the virtual space, with respect to the target wearable object when the target wearable object is caused to wear the first item object.

14. An information processing method executed by a computer, the method comprising:

arranging a plurality of game objects whose appearance automatically changes in accordance with an item object to be worn in a virtual space, wherein the plurality of game objects are simultaneously displayed on a display screen;

displaying, concurrently with the plurality of game objects, a plurality of item objects;

receiving, via a user input device, a designation instruction that designates a first item object from among the plurality of item objects;

based on designation of the first item object:
(a) determining whether each of the plurality of game objects that are being simultaneously displayed on the display screen can wear the first item object or cannot wear the first item object, wherein those ones of the plurality of game objects that can wear the first item object are each classified as a target wearable object and those ones of the plurality of game objects that cannot wear the first item object are each classified as a target non-wearable object;

(b) for each classified target wearable object, including in cases where there are multiple target wearable objects that have been classified, automatically updating how each one of the plurality of game objects that corresponds to a respective target wearable object is displayed by causing the corresponding one to wear the first item object corresponding that has been designated, wherein any target non-wearable objects are not changed to wear first item object corresponding that has been designated; and (c) for each corresponding one of the plurality of game objects that are classified as target non-wearable objects, animating the corresponding game object to perform, within the virtual space, an action with respect to the target wearable object when the target wearable object is caused to wear the first item object.

* * * * *